United States Patent [19]

Brown et al.

[11] 4,108,816

[45] Aug. 22, 1978

[54] CROSS-LINKABLE EMULSIFYING AGENTS AND AQUEOUS EMULSIONS CONTAINING THE SAME

[75] Inventors: George L. Brown, Scotch Plains; Albert C. Chen, East Brunswick, both of N.J.

[73] Assignee: Mobil Oil Corporation, New York, N.Y.

[21] Appl. No.: 827,777

[22] Filed: Aug. 19, 1977

Related U.S. Application Data

[63] Continuation of Ser. No. 606,811, Aug. 22, 1975, abandoned.

[51] Int. Cl.$^2$ .................. C08L 61/28; C08L 63/00
[52] U.S. Cl. .................. 260/29.4 R; 252/352; 252/357; 528/130; 528/135; 528/404; 528/261; 260/834; 260/850
[58] Field of Search .................. 260/70 A, 71, 67.6 R, 260/849, 29.4 R, 834; 252/357

[56] References Cited

U.S. PATENT DOCUMENTS

| | | | |
|---|---|---|---|
| 2,976,261 | 3/1961 | Wagner | 260/71 |
| 3,310,416 | 3/1967 | Schibler | 106/285 |
| 3,645,973 | 2/1972 | Schibler | 260/67.6 R |

*Primary Examiner*—Theodore E. Pertilla
*Attorney, Agent, or Firm*—Charles A. Huggett; Michael G. Gilman; Mitchell G. Condos

[57] ABSTRACT

Thermally cross-linkable emulsifying agents are provided by reacting a polyoxyalkylene glycol with an excess of aminoplast resin sufficient to enable one molecule of the aminoplast resin to be reacted onto each end of the glycol. These agents markedly reduce the surface tension of water and are effective emulsifying agents and, when used in aqueous emulsion coating compositions to emulsify a water insoluble resinous component, the cross-linkable emulsifying agents provide Newtonian flow characteristics and they react when the deposited film is baked to resist extraction from the cured film.

5 Claims, No Drawings

CROSS-LINKABLE EMULSIFYING AGENTS AND AQUEOUS EMULSIONS CONTAINING THE SAME

This is a continuation, of application Ser. No. 606,811, filed Aug. 22, 1975 now abandoned.

The present invention relates to cross-linkable emulsifying agents, and to aqueous emulsions containing resin in the form of liquid droplets maintained in stable emulsions by means of said emulsifying agents.

One of the prime difficulties in providing aqueous emulsion coating compositions for the coating of sanitary cans is the extractability of the emulsifier which is used to emulsify one or more of the resins relied upon for film formation. The present proposal is to provide an emulsifying agent which will be reactive when the applied film is baked to cure the same so that the emulsifying agent will become chemically combined in the cured film, and thus resist extraction. Another important problem is the pseudoplastic rheology of conventional emulsions which hampers desired flow out in the wet film. This invention is concerned with emulsions possessing more Newtonian rheology.

In accordance with this invention, a polyoxyalkylene glycol, especially a polyoxyethylene glycol, is reacted with a large excess of aminoplast resin, so that one molecule of the aminoplast resin is reacted onto each end of the polyethylene glycol. These reaction products are found to possess unexpectedly superior emulsification capacity and, curiously, essentially Newtonian flow characteristics are encountered. The reaction product retains some of the N-alkylol reactivity (normally N-methylol groups) originally present in the aminoplast resin so that the composite emulsifying agent is cross-linkable, e.g., it reacts with any active hydrogen in the applied film to become chemically incorporated therein. Also, these emulsifying agents are preferably used in emulsion systems which contain an aminoplast curing agent, and here the composite emulsifying agents of this invention simply become part of the aminoplast curing agent after the emulsified resin particles coalesce to form the desired film.

In aqueous emulsion coating compositions, a water insoluble resinous component, and preferably one which contains active hydrogen for cure, is emulsified into the aqueous continuum of the composition using the cross-linkable emulsifying agents of this invention, and the Newtonian flow characteristics can be used to provide superior flow characteristics. More particularly, in roller coating, emulsions with Newtonian rheology provides better leveling because the lower viscosity in the film better enables ridges and other surface defects to flow out. The conventional surfactants are usually terminated with hydrophilic groups, and this creates emulsions characterized by pseudoplastic flow. In this invention, the two types of surfactants can be used in combination to provide emulsions with selected intermediate flow characteristics.

Referring more particularly to the polyoxyalkylene glycols which are employed in this invention, any polyoxyalkylene glycol having a molecular weight of at least about 200, and containing from 2-4 carbon atoms in the alkylene group may be used. However, polyoxyethylene glycols are particularly preferred since these are most effective in lowering the surface tension of water. Particularly with polyoxyethylene glycol it is preferred to employ higher molecular weight, e.g., from about 1,000 to about 20,000.

The aminoplast resin is subject to considerable variation. As is well known, aminoplast resins are heat hardening reaction products of formaldehyde with polyamines such as urea, melamine, benzoguanamine, and the like. The aminoplast resins generally provide the N-methylol group, but this group is frequently preferred in etherified form, usually with a $C_1 - C_4$ alcohol. In the present instance, the reaction with the polyoxyalkylene glycol is favored by the presence of ether groups, since this permits the reaction to proceed by transetherification rather than direct etherification, though either reaction is permissible. To ease the transetherification reaction, and also to assist combination with water, etherification with methyl alcohol is particularly preferred. On this basis, the four preferred aminoplast resins are (hexamethoxymethyl melamine; tributoxytrimethoxymethyl melamine; tetramethoxymethyl benzoguanamine; and methoxylated urea-formaldehyde resin.)

The reaction between the aminoplast resin and the polyoxyalkylene glycol is simply carried out by taking any of the named aminoplast resins and combining it with a minor proportion of the selected polyoxyethylene glycol, and then heating the mixture at a temperature of from 100°–120° C., with volatiles (alcohol) being removed with the aid of vacuum. An acid catalyst, such as p-toluenesulfonic acid, nonylphenyl polyoxyethylene phosphate or nonylphenyl polyoxyethylene sulfate, is added.

Proportions are not critical so long as there is more than 1 mol of aminoplast resin per equivalent of hydroxy in the polyoxyethylene glycol. Typical proportions are 100 parts of the aminoplast resin to 20 parts of the glycol, the reaction being carried out in the presence of 0.5–1.0 parts of acid catalyst.

As a result of the reaction, substantially all of the hydroxy functionality is consumed (as evidenced by the removal of alcohol), some of the aminoplast resin is increased in molecular weight, and some unreacted aminoplast resin is also present.

Proceeding as described above, several cross-linkable emulsifying agents were produced having the analysis set forth in the table which follow.

TABLE

| Cross-Linkable Emulsifying Agent | Reactants (100 Parts Aminoplast Resin - 20 Parts Glycol) | Wt % Cross-Linkable Emulsifying Agent | Wt % Aminoplast Oligomer | Wt % Free Aminoplast |
|---|---|---|---|---|
| 1 | Hexamethoxymethyl melamine Polyoxyethylene glycol 3,000 | 20.6 | 42.3 | 37.1 |
| 2 | Hexamethoxymethyl melamine Polyoxyethylene glycol 6,000 | 18.6 | 52.7 | 28.7 |
| 3 | Hexamethoxymethyl melamine Polyoxyethylene glycol 15,000 | 17.3 | 36.8 | 45.9 |
| 4 | Tributoxy-trimethoxymethyl melamine Polyoxyethylene glycol 1,540 | 27.8 | 36.8 | 35.4 |
| 5 | Tributoxy-trimethoxymethyl melamine Polyoxyethylene glycol 3,000 | 21.9 | 41.5 | 36.6 |
| 6 | Tributoxy-trimethoxymethyl melamine Polyoxyethylene glycol 6,000 | 19.3 | 40.3 | 40.4 |

TABLE-continued

| Cross-Linkable Emulsifying Agent | Reactants (100 Parts Aminoplast Resin - 20 Parts Glycol) | Wt % Cross-Linkable Emulsifying Agent | Wt % Aminoplast Oligomer | Wt % Free Aminoplast |
| --- | --- | --- | --- | --- |
| 7 | Tributoxy-trimethoxymethyl melamine Polyoxyethylene glycol 15,000 | 17.5 | 33.0 | 49.5 |

Using a similar product produced by reacting 100 parts of methoxylated urea-formaldehyde resin with 20 parts of polyoxyethylene glycol 6,000 in the presence of 0.75% nonylphenyl polyoxyethylene phosphate, the following results are obtained using an aqueous emulsion of high molecular weight epoxy resin, 2-hexoxy ethanol being utilized to render the epoxy resin emulsifiable in the aqueous phase.

increased to 60 parts and 140 parts, respectively. In this way, three different emulsions were obtained, and their performance analyzed both as initially prepared, and after storage for various periods. The results after storage for 3 months at room temperature, followed by 20 days at 90° F. are reported in Table III which follows.

TABLE III

| | Cross-Linkable Emulsifying Agent With | | |
| --- | --- | --- | --- |
| | Hexamethoxymethyl Melamine | Tributoxy-trimethoxymethyl Melamine | Tetramethoxymethyl Benzoguanamine |
| Nonvolatile material | 25.5% | 25.5% | 25.5% |
| pH | 7.0 | 6.9 | 7.0 |
| Formaldehyde | 0.016 | 0.014 | 0.010 |
| Percent of total $CH_2O$ | 4.6 | 5.3 | 4.0 |
| Deposited film thickness (mils) | .1 -.2 | .1-.2 | .1-.2 |
| Methyl ethyl ketone double rubs | 80 | 80 | 80 |
| Film removed | 5% | 5% | 5% |
| Adhesion before pasteurization | Excellent | Excellent | Excellent |
| Adhesion after pastuerization | Good | Excellent | Excellent |
| Blush | Very slight | Very slight | Slight |

TABLE II

| | Ex. 1 | Ex. 2 |
| --- | --- | --- |
| Methoxylated urea-formaldehyde resin Polyoxyethylene glycol 6,000 | — | 18 |
| Methoxylated urea-formaldehyde resin | 15 | |
| Diglycidyl ether of bisphenol A having an epoxide equivalent weight in the range of 2500 - 4000 | 100 | 100 |
| 2-hexoxy ethanol | 45 | 45 |
| Nonylphenyl polyoxyethylene phosphate (33% in water) | 3 | 3 |
| Water | 120 | 120 |
| Nonionic surfactant (note 1) | 5 | — |
| Particle size (microns) | 90% 1-2 | 90% 1-4 |
| Surface tension - dynes/cm. | 30.3 | 29.4 |
| Solid content | 44.1% | 42.4% |
| pH | 6.8 | 6.5 |
| Deposited film thickness (mils) | .1 - .2 | .1 - .2 |
| Methyl ethyl ketone double rubs | 180 | 80 |
| Film removed | 10% | 10% |
| Adhesion before pasteurization | Excellent | Excellent |
| Adhesion after pasteurization | Excellent | Excellent |
| Blush | Slight | Slight |
| T-Bend | 5T | 6T |
| Reverse Impact | 32 | 32 |

Note 1-Pluronic F 127 is used. It is a solid, poorly water soluble surfactant having a polyoxypropylene hydrophobe of molecular weight 4000 adducted with sufficient ethylene oxide to provide about 70% polyoxyethylene in the total molecule.

As can be seen, the results are fully comparable, but the emulsions containing the surface active agents of this invention have markedly different flow properties, and flow out to remove ridges on roller coating is significantly superior.

Examples 1 and 2 were modified by the inclusion in each of 2 parts of tributoxy-trimethoxymethyl melamine, and it was found that this somewhat improved the blush resistance of each. Upon storage for 20 days under various conditions (room temperature, 90° F. and 120° F.) the performance of the respective systems was substantially the same, indicating that the substitution of the polyoxyethylene glycol-aminoplast reaction product for the nonionic emulsifying agent normally used did not change the stability of the emulsions.

Example 2 was repeated using three different aminoplast resins in combination with the cross-linking emulsifying agent bas on polyoxyethylene glycol 6,000. Also, the 2-hexoxy ethanol and the water content were As can be seen, the cross-linkable surfactants of this invention produce emulsions which perform well after prolonged storage, including a period of storage at elevated temperature, thus establishing the provision of stable emulsions capable of performing effectively over a long period of time.

It has previously been indicated that emulsion coating compositions are provided which contain a water insoluble resinous component which is emulsified using the cross-linkable emulsifying agents of this invention. These water insoluble resinous components are well known in emulsion coating compositions, and they may be constituted by any water insoluble resin which is either liquid, or which can be rendered liquid by dissolving the same in an organic solvent having limited water miscibility. Resinous polyepoxides have been used to illustrate this invention, but obviously other resins may be used including polyester resin and addition polymers and copolymers. Almost any linear resin is soluble, and can be utilized in this fashion and it will be appreciated that any resin which has previously been used in emulsion coating compositions can be used in this invention.

The cross-linkable emulsifying agents of this invention are effective to reduce the surface tension of water when used in very small concentration, e.g., they are fully effective in the range of 0.0001% to 0.1%, and, of course, larger proportions are also effective. Thus, and from the standpoint of emulsification, one could use from about 0.01% up to about 40%. It must be recalled that the cross-linkable emulsifying agents of this invention include unreacted aminoplast resins, as well as aminoplast resins which have been increased in molecular weight. These are effective curing agents and, hence, can be present in the system in large amount. Considering only the emulsifying agent component of the mixture which is produced, it is preferred to have this present in a proportion of from 0.1% to 15%, most preferably in the range of 1% to 10%, based on the weight of the resinous component which is emulsified.

The invention is defined in the claims which follow.

We claim:

1. A thermally cross-linkable emulsifying agent consisting essentially of the transetherification reaction product of a polyoxyethylene glycol having a molecular weight in the range of from about 1,000 to about 20,000, with an excess of aminoplast resin sufficient to enable one molecule of the aminoplast resin to be reacted onto each end of the glycol, said aminoplast resin being etherified with methanol and said transetherification reaction being carried out at a temperature of from 100°–120° C. in the presence of an acid catalyst while removing alcohol.

2. A thermally cross-linkable emulsifying agent as recited in claim 1 in which said aminoplast resin is selected from hexamethoxymethyl melamine; tributoxy-trimethoxymethyl melamine; tetramethoxymethyl benzoguanamine; and methoxylated urea-formaldehyde resin.

3. An aqueous emulsion comprising water having emulsified therein liquid particles of a water insoluble resinous component which is a solid resin dissolved in an organic solvent of limited water miscibility, said particles being stabilized in the emulsion by means of the thermally cross-linkable emulsifying agent recited in claim 1 in an amount of from 0.1% to 15% of said emulsifying agent based on the weight of the resinous component which is emulsified.

4. An aqueous emulsion as recited in claim 3 in which said water insoluble resinous component is a resinous polyepoxide and said emulsion further includes water dispersible aminoplast resin.

5. An aqueous emulsion as recited in claim 3 in which said emulsion further includes an emulsifying agent yielding an emulsion possessing pseudoplastic properties so as to provide an emulsion which possesses a rheology which is intermediate the Newtonian rheology established by said thermally cross-linkable emulsifying agent and the pseudoplastic rheology established by the other emulsifying agent.

* * * * *